United States Patent [19]
Bodkin

[11] 3,997,818
[45] Dec. 14, 1976

[54] LOAD SELECTIVE POWER SYSTEMS

[76] Inventor: Lawrence E. Bodkin, 1833 Ryar Road, Jacksonville, Fla. 32216

[22] Filed: Mar. 17, 1975

[21] Appl. No.: 559,381

Related U.S. Application Data

[63] Continuation-in-part of Ser. No. 376,312, July 5, 1973, abandoned.

[52] U.S. Cl. .......................... 317/33 SC; 317/18 R; 317/52
[51] Int. Cl.² ...................... H02H 7/00; H02H 1/02
[58] Field of Search .......... 317/33 SC, 33 R, 33 C, 317/52, 13 R, 18, 20, 22, 9; 321/18, 40, 51, 54, 16, 19; 307/262, 127; 323/36, 24, 106, 119, 22; 328/70

[56] References Cited

UNITED STATES PATENTS

| | | | |
|---|---|---|---|
| 3,350,607 | 10/1967 | Jones | 317/33 SC |
| 3,525,921 | 8/1970 | Wattson | 321/18 |
| 3,781,608 | 12/1973 | Geiger | 317/33 SC X |

Primary Examiner—J D Miller
Assistant Examiner—Patrick R. Salce
Attorney, Agent, or Firm—George H. Baldwin; Arthur G. Yeager

[57] ABSTRACT

A load selective circuit in which the dangers associated with accidental contact with conductors and terminals, sometimes causing electrocution, are eliminated even during the time a proper load is connected to the supply circuit and is deriving power through it from an alternating current source. Such a proper load must include a unidirectional current device in series with the load. Half-wave power can be supplied to a load with one such current device and with only two load terminals, whereas full-wave power can be supplied to a load with two such current devices and three load terminals. The supply circuit for half-wave includes a resistor-capacitor phase control SCR circuit; and for the full-wave, two such SCR circuits are included. Various other details include 1) a bridge circuit between two of the three terminals of the full-wave supply to turn off one half-wave when only the other half-wave is shorted; 2) a bidirectional load circuit; 3) AC and DC full wave load circuits; 4) and monitor circuits for connecting in the load circuit which will indicate certain faults in the supply circuit.

80 Claims, 27 Drawing Figures

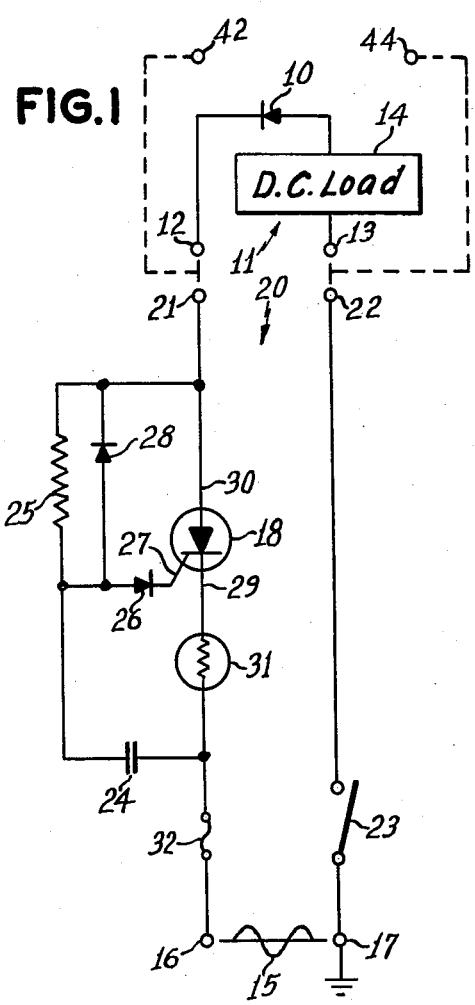
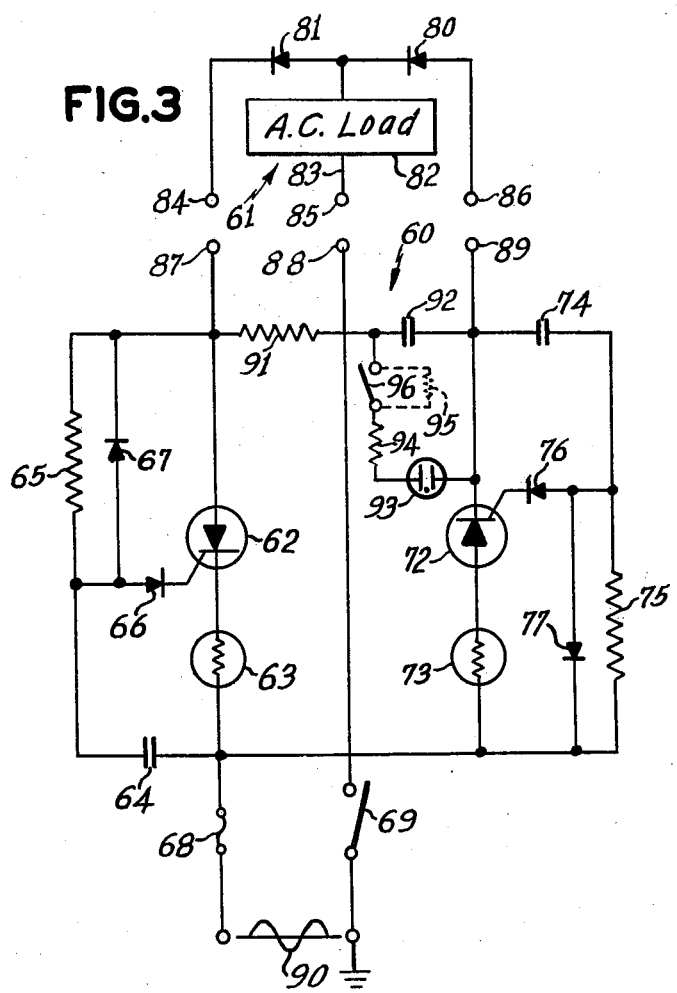
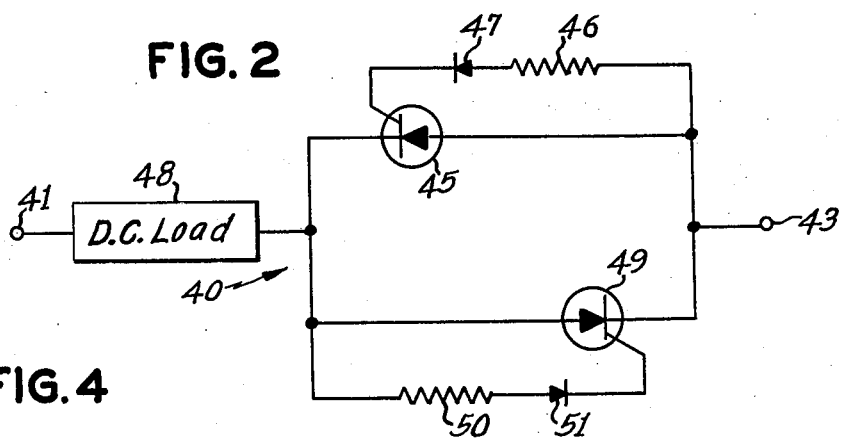
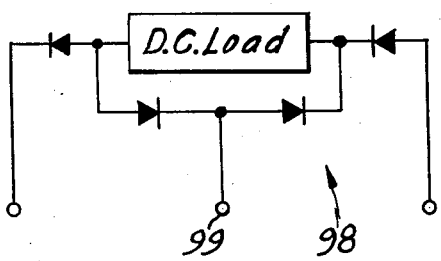

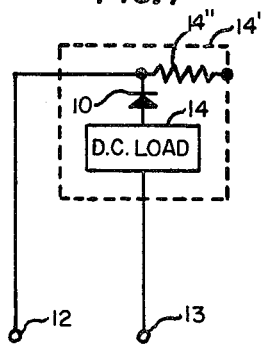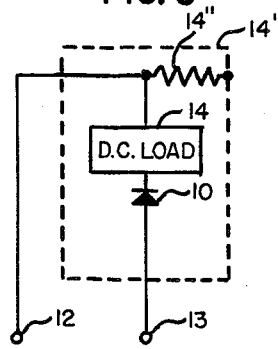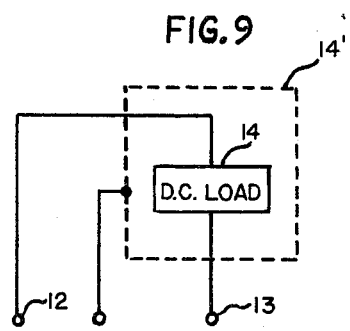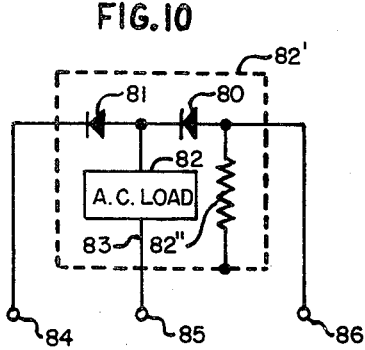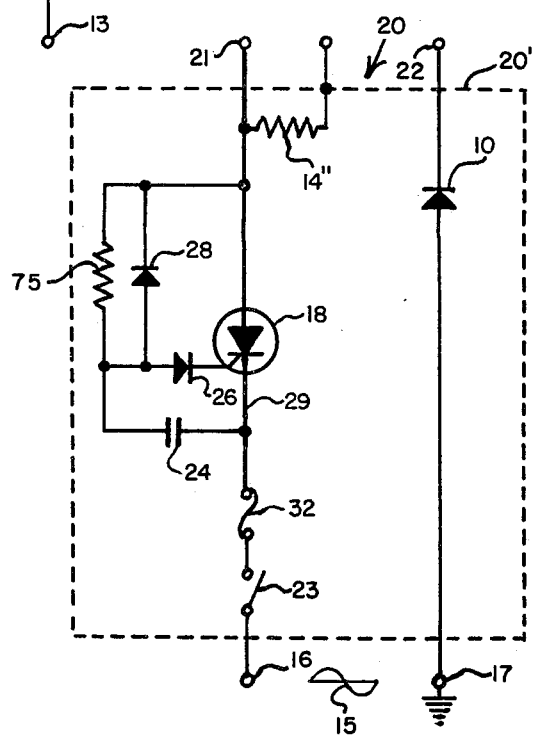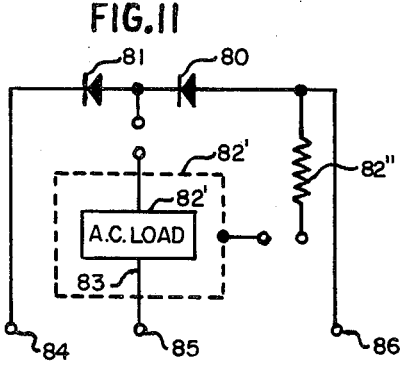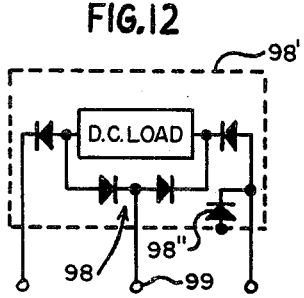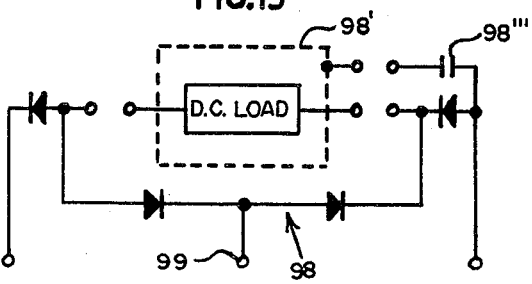

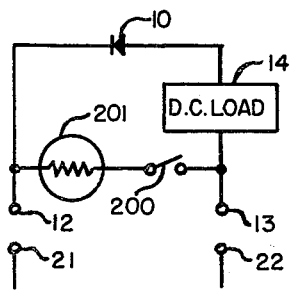
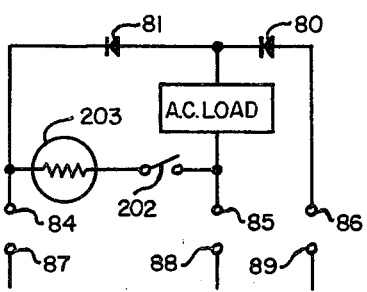
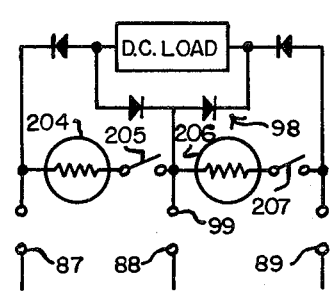
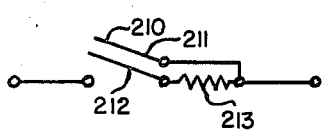
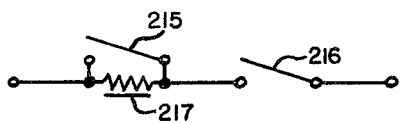
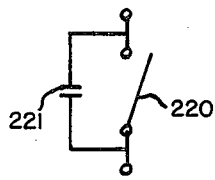
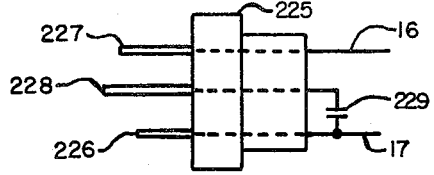
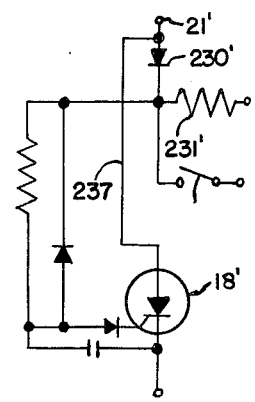
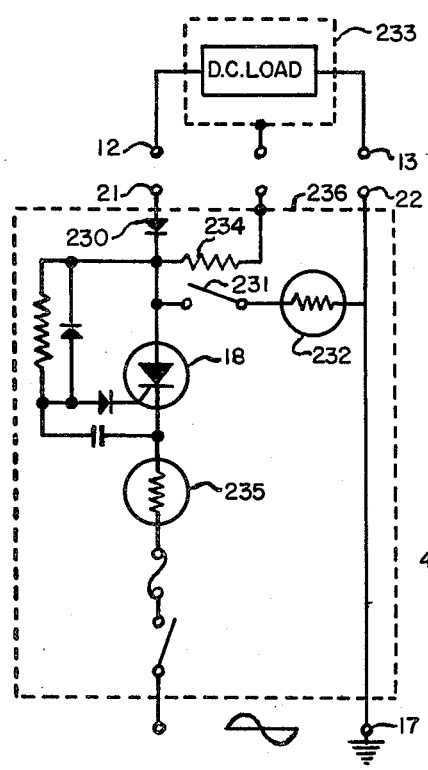
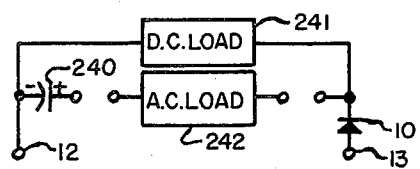
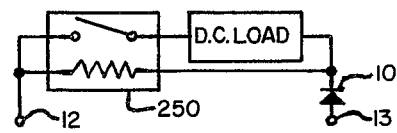
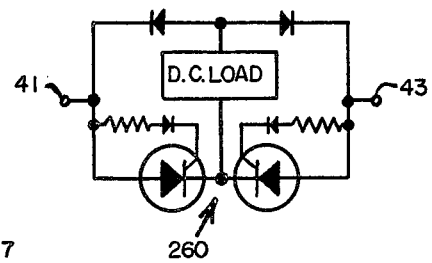

LOAD SELECTIVE POWER SYSTEMS

CROSS REFERENCE TO RELATED APPLICATION

This application is a continuation-in-part of application Ser. No. 376,312, filed July 5, 1973, now abandoned, entitled LOAD SELECTIVE POWER SYSTEMS, now abandoned.

BACKGROUND OF THE INVENTION

1. FIELD OF THE INVENTION

This invention relates to load selective power systems and more particularly to a power system in which dangers such as accidental electrocution are prevented.

2. DESCRIPTION OF THE PRIOR ART

There have been many attempts in the prior art to prevent accidental electrocution of a person caused by the person being the load, by quickly detecting and reacting to resultant overload and/or by detecting and reacting to shorting between a supply conductor or terminal and an external ground, or a short occuring in the load where the person may be connected between the shorted load and ground. There have also been many attempts at providing overload and/or over voltage protection for circuits. Illustrative of such prior art are the following U.S. Pat. Nos. 3,197,676 — Jones; 3,312,862 — Currin; 3,449,635 — Staples; 3,543,090 — Pfister el al; 3,566,198 — Delahunty; 3,573,550 — Baker; 3,602,773 — Berstein; and 3,617,808 — Yoder. None of these prior art patents, found in the search on the invention herein disclosed, either alone or in any appropriate combination, anticipates or renders the disclosed invention unpatentable, nor does the prior art function in the manner herein disclosed to solve the heretobefore problems of the prior art.

SUMMARY OF THE INVENTION

In one of the aspects of this invention the power system includes a supply circuit having a pair of terminals including a unidirectionally triggered switching means adapted to be connected to an alternating current source for supplying current in one direction. The supply circuit also includes means operatively connected to the switching means for substantially reducing the current flow through the switching means in the one direction whenever an improper load circuit omitting a unidirectional blocking means is connected to the supply circuit across the terminals. A proper load circuit includes a load and a unidirectional blocking means connected in series to the load for passing substantial current in said one direction through the load and passing substantially no current in the opposite direction.

Other aspects include various specifics of the system wherein the blocking means is a rectifier and the switching means is a reverse blocking thyristor. The means for substantially reducing the current flow includes a capacitor for triggering the gate of the thyristor, with the capacitor discharging below the firing potential whenever an improper load circuit is connected. The means for substantially reducing the current flow also includes a rectifier coupled between the gate and anode of the thyristor and oriented in a direction opposite to the one direction. The supply circuit also includes a resistor connected between the gate and anode of the thyristor which has a resistance value sufficiently high to maintain the firing angle of the thyristor substantially at 180 degrees, the RC time constant of the resistor and capacitor being greater than one half-cycle of the alternating current source.

In other aspects of the invention, another load circuit having a pair of input terminals and another load is connected to one of the input terminals, with a pair of unidirectionally triggered switching means, in parallel and having the orientation of each reversed from the other, connected between the other load and the other input terminal so that current may pass through the other load in either direction depending upon the manner of connection which may exist at the time between the pair of input terminals and respective supply circuit terminals. Other details of this bidirectional other load circuit is seen where the pair of unidirectional switching means are thyristors, and a pair of means are connected respectively between the gate and anode of each thyristor for controlling the firing potential thereof, each such means including a resistor and a rectifier oriented in the same direction as its associated thyristor and being of values determined by individual thyristor gate characteristics for adjusting sensitivities thereof and permitting only one thyristor of the other load to be conducting at any particular time when attached to the terminals of the supply circuit.

In accord with another embodiment of the invention full-wave power may be supplied to a proper load circuit having three input terminals and a pair of unidirectional blocking means respectively connected to two of such input terminals and oriented in the same current carrying direction. The load circuit includes a load connected between the pair of blocking means and adapted to be coupled to the other input terminal. A supply circuit having three output terminals and including a pair of unidirectionally triggered switching means adapted to be connected to an alternating current source supplies current in such direction with one unidirectional blocking means passing one half-cycle of current from the source through the load and through one of the unidirectionally triggered switching means back to the source, while the other unidirectionally triggered switching means passes the other half-cycle of current from the source through the other unidirectional blocking means and through the load back to the source whereby substantially full wave current is delivered to the load from the source. Connected to the pair of switching means is a means for substantially reducing the current flow through the pair of switching means to effectively terminate current flow through the load whenever an improper load circuit omitting a unidirectional blocking means is connected to the supply circuit across any two of the three output terminals or whenever an improper load circuit omitting a pair of unidirectional blocking means is connected to the three output terminals of the supply circuit.

Other aspects of the above full wave embodiment include the connection of an auxiliary load circuit, having another load in series with another unidirectional blocking means and oriented in the same direction, is connected in parallel with the load and one unidirectional blocking means so that substantially half-wave current is delivered to the other load. The full-wave embodiment also includes additional means for substantially reducing the current flow and includes a resistor and capacitor in series across two output terminals. A gaseous discharge bulb and a series connected reset switch are located in parallel with the above capacitor.

Monitor circuits in accord with other aspects are disclosed and are operable upon functioning failure of the thyristors to indicate such failure and to warn of the more normally dangerous condition of the supply circuit. The supply circuit includes current interrupting means connected in series with the thyristors, and the monitor means, indicative of such failure, may include means for activating the interrupting means to prevent current flow from the alternating current source. Delay means preferably should be included in such monitor for delaying activation of the interrupting means a predetermined time greater than the time in which the monitor would be made operable by transient conditions.

The monitor circuits could include means, such as a relay, for audibly indicating such failure and means, such as a bulb, for visually indicating such failure.

In yet other aspects the power system may include a proper load circuit including a load with at least two terminals and at least one unidirectional blocking means connected between the terminals and in series with the load. A supply circuit for such proper load circuit may include at least two supply terminals connected to the load terminals, and at least one controlled unidirectional blocking means connected to the load circuit through the supply terminals, the controlled blocking means being adapted to be connected to an alternating current source so that a series circuit between the load circuit and the controlled blocking means and the alternating current source is established. The supply circuit includes a control circuit in parallel with the controlled blocking means which is turned on and turned off by the control circuit according to the direction of current flow determined by the proper load circuit and any improper other load which may be connected. The proper load circuit is operative to eliminate the current in the turn-off direction due to the series inclusion of the unidirectional blocking means with the load, and being operative to pass both turn-on current and power current from the source which are flowing in the same direction and causing substantial current from the source to flow in said proper load circuit, while the supply circuit causes no substantial current flow to any improper other load circuit in which appreciable current in the reverse turn-off direction is permitted to flow in such other improper load. The control circuit is a resistor-capacitor phase control circuit which controls the firing potential of the gate of the controlled unidirectional blocking means.

A general object of the present invention is to provide a novel load selective power system.

Another general object is to provide a power system in which accidental electrocution and the like is prevented.

A particular object is the provision of an improved supply circuit having unidirectionally triggered switching means with control circuitry to prevent accidental electrocution in which a ground path for current through a body is provided or the body becomes connected across the supply circuit output terminals.

Another particular object is to provide an improved supply circuit in which a more convenient but safe exposure of electrical output terminals or conductors may be employed, particularly for use in supplying power to moving contacts for cranes, tramways, railways, trolleys and personal conveyances and the like.

A specific object is the provision of an improved supply circuit in which power transmission from a source to a load is more safely delivered than presently employed in the art and which alleviates many problems of the prior circuit arrangements considered to be overly hazardous.

Another specific object is to provide an improved selective supply system, which may be connected, for example, between the normal house fuses or circuit breakers and the various outlets or loads, whereby any short or improper load across the outlets or loads will interrupt the current flow to the various outlets or loads and only proper loads may derive power therefrom.

Other specific objects are to provide an improved load selective power system that is simple in design and easily constructed, inexpensively manufactured and maintained, and reliable and efficient in use.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a circuit diagram of the first embodiment of the load selective power system in accord with this invention, in which the half-wave power is delivered to the load;

FIG. 2 is a circuit diagram of a bidirectional load circuit in accord with this invention and usable with the system of FIG. 1;

FIG. 3 is a circuit diagram of the second embodiment of the load selective power system in accord with this invention, in which full-wave power is delivered to the load;

FIG. 4 is a circuit diagram of a unidirectional load circuit which may be used in a slightly modified circuit of FIG. 3, in which full wave unidirectional power is delivered to the load;

FIGS. 7 and 8 are circuit diagrams of load circuits in accord with this invention usable with the system of FIG. 1;

FIG. 9 is a circuit diagram of a fourth embodiment of the load selective power system in accord with this invention, similar to FIG. 8, but not affording as many protective features;

FIGS. 10–13 are circuit diagrams of load circuits in accord with this invention usable with the systems of FIGS. 3 or 5;

FIGS. 14–16 are circuit diagrams of load circuits usable with the systems of FIGS. 1, 3 or 5 with simple circuit testing incorporated therein;

FIGS. 17 and 18 are circuit diagrams of alternative circuit testing arrangements usable with the load circuits of FIGS. 14–16;

FIGS. 19 and 20 are diagrammatic views of two different component arrangements for eliminating surge currents to the load which the supply circuit is turned on by a switch or by being plugged into a supply;

FIG. 21 is a fifth embodiment of the load selective power system in accord with this invention;

FIGS. 21A and 21B are modifications of FIG. 21;

FIG. 22 is a circuit diagram of a load circuit in accord with this invention usable with the system of FIG. 1, but providing a modified alternating current to an A.C. load;

FIG. 23 is a circuit diagram of a load circuit usable with, for example, the system of FIG. 1; and FIG. 24 is a circuit diagram of a bidirectional load circuit similar to FIG. 2.

DESCRIPTION OF THE PREFERRED EMBODIMENTS

Figure 5:
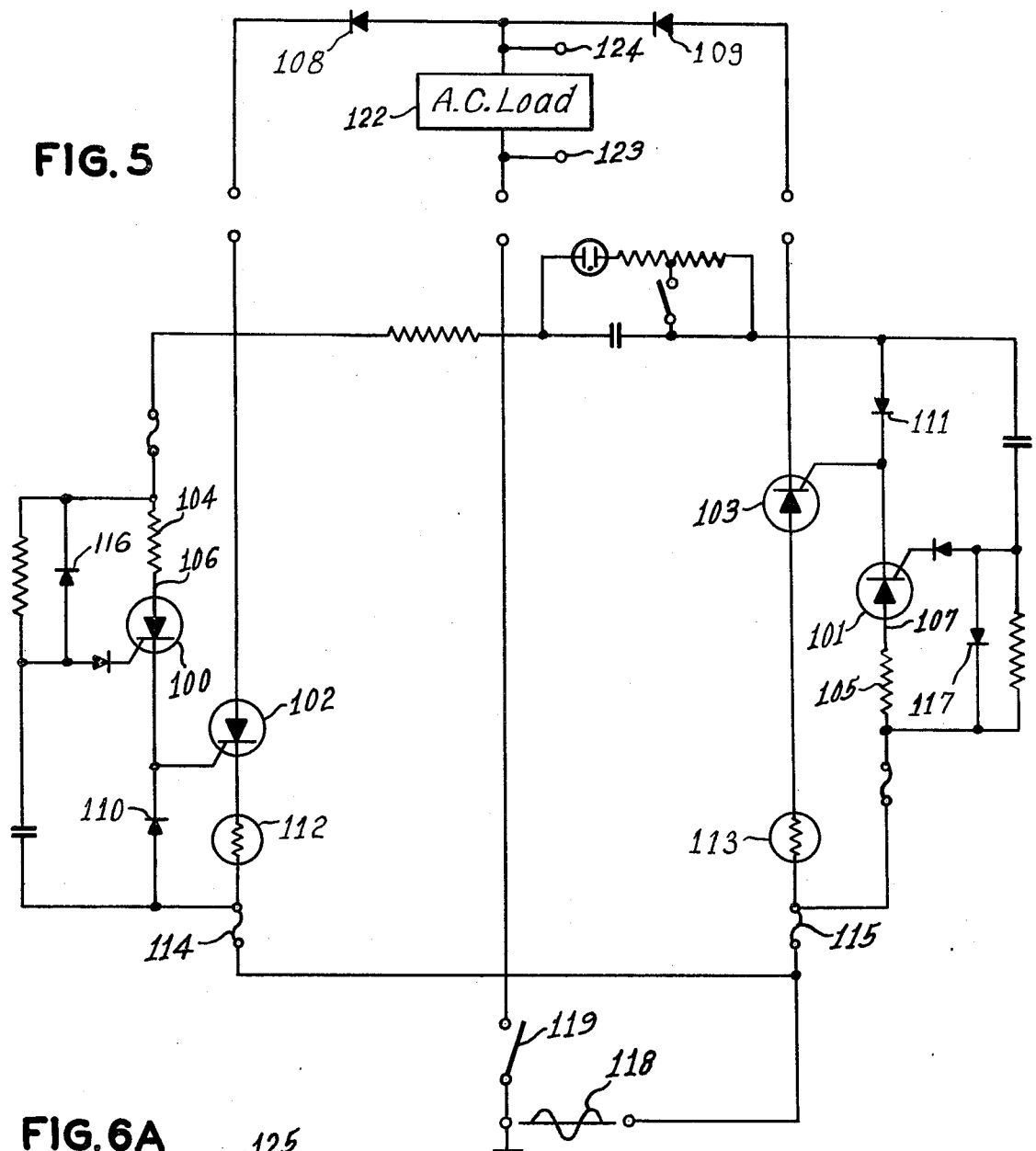
FIG. 5 is a circuit diagram of the third embodiment of the load selective power system in accord with this invention, in which full wave power is delivered to the load with the circuit being able to supply much more power than the circuit of FIG. 3.

The essential feature of this invention is the recognition that one direction of current flow, for example, the positive half cycles of an alternating current supply, could be employed as the source of power while the other direction of current flow, the negative half cycles could be used to discriminate between a proper and an improper load. Thus, a half-cycle directional blocking means in the form of a simple rectifier 10 can be intentionally included in the load circuit, generally depicted by 11, with the load terminals 12 and 13 as shown. The rectifier 10 is in series with DC load 14 and functions to block a discriminator current flow in one direction, for example, during the negative half cycles, and to permit power current flow during the positive half cycles from the alternating current source 15 connected across terminals 16 and 17. It is apparent that rectifier 10 can be located on the other side of DC load 14, and, when so located, additional ground fault protection obviously would be provided between such diode and the load. The depiction of rectifier 10 on the hot side of the DC load 14 was primarily to facilitate a ready comparison and recognition of its inclusion in the hereinafter described full wave AC circuit of FIG. 3.

If an improper load, one without such rectifier 10 is also connected in parallel with the proper load circuit 11, a discriminator current flows during the next negative half-cycle after connecting such improper load. Such discriminator current is effective to temporarily or permanently cause substantially no further current flow during the next or subsequent positive half cycles. The discriminator current thus may effect control by activating or deactivating a unidirectionally triggered switching means or gate controlled rectifier means in the form of a directionally triggered thyristor or SCR 18, in the basic power supply circuit, generally depicted by 20, having output terminals 21 and 22 to which the load circuit 11 is connected and wherein terminals 22 is connected by switch 23 to the ground or neutral to ground side 17 of AC source 15. Rectifier 10 is oriented to pass current in the same direction as SCR 18 thereby permitting power current flow through load 14, but when an improper load is connected in parallel with the proper load circuit 11, a reverse discriminator current is also permitted to flow, and power current flow ceases, as hereinafter more fully described.

Consider the DC load 14 and diode 10 connected by their input terminals 12 and 13 respectively to output terminals 21 and 22, switch 23 is initially closed and the capacitor 24 charges on the positive half cycle of SCR anode voltage to the trigger point of SCR 18 in a time determined by the RC time constant of resistor 25 and capacitor 24 and the rising anode voltage. Diode 26 blocks reverse gate voltage on the negative half cycle of the AC supply voltage. Once the capacitor 24 is sufficiently charged, a triggering current for turning on the SCR 18 is supplied to the gate 27 through diode 26 and resistor 25. The DC load 14 will be supplied a current during one-half of the AC supply cycle. If the output terminals 21 and 22 are shorted for example, the capacitor 24 discharges during the next one-half negative cycle through diode 28 thereby cutting off SCR 18, diode 28 providing very little resistance as compared with the resistance of resistor 25 to discharge capacitor 24 very quickly, and if the short is by the human body, for example, capacitor 24 discharges before any electrocution of the human body, and depending upon contact conditions, most often with little or no sensation of shock by the body. The power to the load is thereby discontinued during such a short because SCR 18 is made non-conducting.

The system according to this invention is seen to include a proper load circuit 11 having a load 14 and a half-cycle directional blocking means in the form of a diode 10 or other rectifying device in series with the load 14 and an improper load circuit cannot derive power from the system in accord with this invention. SCR 18, capacitor 24, diodes 26 and 28 and resistor 25 may be confused with a simple half-wave RC-diode SCR phase control circuit because of many similarities, but the component values for resistor 25 and capacitor 24, in accord with this invention, are selected to provide a relatively long time constant, namely longer than the time of one-half cycle, to prevent charging of capacitor 24 sufficiently to the trigger point of the SCR 18 upon closure of switch 23, particularly when the supply circuit 20 is connected to an improper load. While SCR 18 is in an unfired condition, substantially no current initially flows through the proper load circuit, including diode 10. If a short initially occurs, while SCR 18 is unfired, between the terminals 21 and 22 or across the proper load circuit 11, the only current which would pass through the short would be the rather small current resulting from the charging and discharging of capacitor 24 and any small leakage through SCR 18. The amount of this small current may be varied, as would be apparent to those skilled in the art, by changing the circuit parameters without changing the basic functioning of the supply circuit 20, to discourage careless habits of people regarding the touching of possibly exposed conductors or the like.

Even with a proper load circuit 11 connected and the SCR 18 in fired condition, a short across terminals 21 and 22 or 12 and 13 would cause quick discharge of capacitor 24 through diode 28 thereby de-activating SCR 18, and thereafter any current, but the very small current hereinabove set forth, is inhibited.

If a low resistance contact is provided by the short at the same time that a high power surge pulse is experienced in the conducting direction of the fired SCR 18, the higher current during such half-cycle will flow through such short, but electrocution of a human whose body may constitute the short would not occur, as would be obvious to a person skilled in the art.

The small current passed by capacitor 24 through an improper load provides for continued non-conductance of SCR 18. The shorting of the proper load circuit 11 negates the blocking function of diode 10, and the entire circuit 11 and 20 thus becomes a simple half-wave rectifying power source which is non-conducting due to the lack of a sufficient charge on capacitor 24 for firing SCR 18.

The series connected diode 10 must be oriented in the same conductive direction as the direction of conduction of SCR 18 for proper flow of current. If the diode 10 were connected oppositely, i.e., opposite to the conducting direction of SCR 18, SCR 18 will not be fired due to the fact that capacitor 24 is provided a discharge path having less resistance than its charging path and will not store a charge sufficient to bring the control or gate electrode 27 of SCR 18 up to firing potential.

An improper load applied in parallel to a proper load circuit 11 serves to restore the firing angle of the SCR 18 to a non-conducting state and effect a termination of the power being supplied to the proper load circuit 11.

Except for the aforementioned possibility of initial surge or at the most a generally one-half cycle of current, the very small currents passed by non-rectifying loads permit even direct shorting across the proper load circuit 11 without harm to the power supply system 20, proper load circuit 11 or the element or person causing the direct short.

In the simplest summary of function it may be stated that the capacitor 24 connecting the SCR gate 27 to the SCR cathode 29 through the protective diode 26 acquires a firing potential through resistor 25 which is connected to the SCR anode 30 and at a rate inversely proportional to the value of resistor 25. It may be discharged or reduced to a point below the firing potential required by SCR 18 during the negative half cycles through the diode 28 that parallels resistor 25 at a rate thus made independent of resistor 25 and made dependent upon other resistances in series with diode 28, such as the diode 10 and load 14. Discharge through diode 28 by capacitor 24 would be blocked by diode 10, but a short in parallel with the proper load circuit 11 would permit quick discharge of capacitor 24 and as long as the short were present the SCR 18 would not conduct due to the inability of capacitor 24 to charge sufficiently to cause firing of the SCR 18.

A circuit of this general type, which has a great deal in common with the prior art phase control circuits, may be made to supply non-rectifying or conventional loads wherein the resistance 25, in parallel with the discharge diode 28, would be made to be variable and capable of a range that permits a regulation of the comparative charge-discharge rate that would be effective within the half-cycle with a resultant retardation from essentially zero to 180 degrees or from full "on" to full "off" respectively for conventional loads, all of which is common in the art as shown for example at page 69 of SCR Manual, 4th edition, 1967, General Electric Company.

When the load circuit 11 is given an efficient rectifying quality by connecting the load 14 in series with a diode 10 of good reverse blocking resistance, an external control of the internal circuitry is provided, i.e., an external proper load circuit 11, including a diode 10, can derive power from supply circuitry adjusted to an off condition, but an improper load cannot derive power therefrom. If the diode 10 is arranged to have its polarity in a direction opposing that of the SCR 18, the discharge rate of the phasing capacitor 24 is undiminished but the charge rate is essentially reduced to zero and the SCR gate 27 is not raised to a firing potential. If the load circuit 11 is a proper one, i.e., load 14 is in series with diode 10 and diode 10 has polarity like that of the SCR 18, the discharge rate is effectively reduced to zero and the charge rate is normally determinable by the resistance 25. In a supply circuit 20 where an external control is to be exercised, the charge capability to the triggering potential for the SCR 18 within a half-cycle is no longer a requirement. In fact the protective features of the system in accord with this invention cannot be realized if the triggering potential is achieved within one-half cycle. Higher resistance for resistor 25 coupling the SCR gate 27 to anode 30 becomes highly desirable and should be of a fixed value to insure that it does not drop low enough to cause a firing potential to be achieved within one-half cycle. Thus, a capacitor triggered phase control prior art circuit can be altered to maintain a full "off" condition and may be turned "on" by a rectifying load 11 having a properly directed polarity of diode 10 and power will not be supplied to a non-rectifying load or to a rectifying load of improper polarity. The only small current provided to improper load is that which is passed by the gate resistor 25 and diode 28 caused by the charging and discharging of capacitor 25, other than a possible initial half-cycle pulse, hereinabove mentioned. Where human contact may be expected this small continuous current should be reduced to a subjectively endurable level, although an appreciable level may be of some value in possibly discouraging the adoption of careless habits regarding exposed conductors in general.

The restoration of firing potential is delayed by increased resistance of resistor 25, but may be advanced by reducing the value of capacitor 24 within the limitations set by the current demands of the SCR gate 27.

Turn-off should occur within one-half cycle to minimize any danger to a person shorting the load. The possibility of a half-cycle pulse of great magnitude, before turn-off, is present when conditions permit a very low resistance completion of an improper load circuit during an instant of forward conduction in the supply circuit. Establishment of such a low resistance contact requiring more than the half-cycle of time avoids the possibility of the sizeable half-cycle pulse by accomplishing turn-off within a half cycle and during the initial time of higher resistance.

To cushion the possible pulse overload effects of immediate and direct shorts, a current reactive negative thermal coefficient thermistor 31 is placed in series with the SCR 18. Thermistor 31 should be mounted at the AC supply end if stud mounted heat sink exposure is planned for the SCR 18, but may be alternately located at the supply terminal 16, if isolation is possible. Such protective thermistor 31 at the AC end has little effect upon the basic circuit performance. The fuse 32 is included in a manner common in the art.

In FIG. 1, if the proper load circuit 11, including the DC load 14 and diode 10, is connected to the supply circuit 20, i.e., terminals 12 and 21 are connected and terminals 13 and 22 are connected, the non-polarized load circuitry 40 of FIG. 2 could be connected in parallel with the proper load, i.e., terminal 41 connected to terminal 42 or 44 and terminal 43 connected to the other terminal 44, or 42, the non-polarized or non-directionalized load circuit 40 would receive half-cycle power in either direction connection to supply circuit 20. With terminals 41 and 43 connected respectively to terminals 42 and 44, the positive half-cycles will turn on SCR 45 through its gate resistor 46 and diode 47 so that power is supplied to the DC load. The negative half-cycles will be blocked by SCR 45 and will be inhibited from passing through SCR 49 since its gate resistor 50 will be chosen large enough to prohibit SCR 49 from firing, i.e., the reverse discriminator current is smaller than the current in the forward direction through SCR 18, whereby current is supplied to the load 48 from terminal 43 to 41, only. Since the negative half-cycles are blocked in the manner aforementioned, the functioning of the circuit of FIG. 1 is unaltered, and if a short occurs across terminals 41 and 43 current flow in the entire circuit is substantially reduced to the aforementioned small currents of charging and discharging of the capacitor 24 every half-cycle and the very minute leakage current through the SCR 18. With terminals 43 and 41 connected respectively to terminals 42 and 44, the positive half-cycles will turn on SCR 49 through its gate resistor 50 and diode 51 so that power is supplied to the DC load 48. The negative half-cycles will be blocked by SCR 49 and will be inhibited from passing through SCR 45 since its gate resistor 46 will be chosen large enough to prohibit SCR 45 from firing in response to the comparatively smaller discriminator current, whereby current is supplied to the load 48 from terminal 41 to 43, only. A triac or other triggered bidirectional equivalent could be substituted for SCR's 45 and 49, as would be apparent to persons skilled in the art.

It would be readily apparent that the entire circuit of FIG. 1, i.e., circuits 20 and 11, could be used as the power source in electrically powered "Go-Cart" track racers or in an arrangement similar to the common bumper car system at amusement fairs, zoos and the beaches, for example, with such power source feeding conveniently exposed conductors alternately, connected to terminals 42 and 44. The cars would be provided with the proper non-polarized or non-directionalized load circuit 40 of FIG. 2 with terminals 41 and 43 being constituted by spaced, wiping contacts engageable with such exposed conductors. Of course, a speed control or the like of proper type would normally be provided for the DC motor load, as would be apparent to those skilled in the art. Since a short by a person across such exposed conductors would be effective to cut-off power to all of the cars, substantially greater safety would be provided by a system in accord with this invention than is presently provided.

In the power system shown in FIG. 3, an AC supply circuit 60 for powering an AC proper load circuit 61 is depicted in accord with another embodiment of the invention. It is believed to be easily recognized that SCR 62, thermistor 63, capacitor 64, resistor 65, diodes 66 and 67, fuse 68 and switch 69 correspond to similar components identified and described in FIG. 1, and that SCR 72, thermistor 73, capacitor 74, resistor 75 and diodes 76 and 77 also correspond to similar components in FIG. 1.

The AC proper load circuit 61 includes a pair of diodes 80 and 81 which conduct in the same directions as SCR's 62 and 72. The AC load 82 is connected in common line 83 with AC load circuit 61 thus having three input terminals 84, 85, and 86.

When the switch 69 is closed and the output terminals 87, 88, and 89 of the supply circuit 60 are connected to respective input terminals 84, 85, and 86 of the AC load circuit 61, the SCR's 62 and 72 will begin to conduct after the firing is obtained in the same manner, as hereinbefore described in connection with SCR 18 of FIG. 1. Current will thus flow in the conventional direction through switch 69, terminal 88, terminal 85, line 83, AC load 82, diode 81, terminal 84, terminal 87, SCR 62, thermistor 63 and fuse 68 during the positive half-cycles from the source 90. During the negative half-cycles, current will flow through fuse 68, thermistor 73, SCR 72, terminal 89, terminal 86, diode 80, AC load 82, line 83, terminal 85, terminal 88, switch 69 back to the source 90. Accordingly, with a three wire system between AC supply circuit 60 and AC proper load circuit 61, AC power may be supplied to the AC load 82, whereas a two wire system in accord with this invention can only be used to supply power to a proper DC load circuit, as specifically shown in FIG. 1.

With the AC load circuit 61 connected to supply circuit 60, the switch 69 is initially closed and the positive half-cycles raise the capacitor 64 to a firing potential to cause SCR 62 to conduct, in the same manner as described with respect to FIG. 1. The negative half-cycles, prior to conduction of SCR 62, cause current flow in the conventional direction from supply 90 through fuse 68, resistor 75, capacitor 74, terminals 89 and 86 diode 80, AC load 82, line 83, terminals 85 and 88 and back through switch 69 to supply 90, thus raising the potential of capacitor 74 to the firing potential of SCR 72. With both SCR's 62 and 72 conducting, AC power from supply 90 is supplied to the AC load 82 in the manner hereinabove set forth.

When a short occurs between terminals 87 and 89 of supply circuit 60, with proper load circuit 61 connected, both capacitors 64 and 74 discharge through load diodes 80 and 81 respectively, and SCR's 62 and 72 become non-conducting and remain non-conducting until after the short is removed. In accord with the invention, transmitting bridge means, in the form of resistor 91 and capacitor 92, are connected preferably within the supply circuit 60 between the two hot lead terminals 87 and 89. The function of such bridge means is to effect substantially simultaneous cut-off, for example, of SCR 62 when a short occurs across terminals 88 and 89, such short causing turn-off of SCR 72 in a manner hereinbefore explained in connection with FIG. 1. Similarly, if a short occurs between terminals 87 and 88, SCR 62 will be cut-off in the manner set forth in FIG. 1, while SCR 72 will be cut-off due to the bridge means 91 and 92.

The bridge means does not interfere with the aforesaid cutting-off of both SCR's 62 and 72 when the two hot leads 87 and 89 are shorted. Consider the circuit of FIG. 3 without bridge means 91 and 92 (and without the neon tube and connecting resistors and switch thereinafter described), a short between terminals 87 and 89, by a non-directional conductance, i.e., a resistor, or a directional conductance i.e., a diode, oriented in the direction opposite to the conducting direction of SCR's 62 and 72 and diodes 80 and 81, provides for a reverse current path to ground terminal 88 to terminal 89 through the AC load 82 and its pick-up diode 81, and a reverse current path to terminal 87 from ground terminal 88 through the AC load 82 and its pick-up diode 80. If such a short is by a sufficiently high resistance, for example, 10 megohms, turn-off may not be effected and such high resistance may have no effect or a slight effect to reduce the current being supplied to the AC load 82 without effecting cut-off of the SCR's 2 and 72. If a capacitance of any appreciable value is connected across terminals 87 and 89, immediate turn-off of SCR's 62 and 72 is accomplished. If a resistor and capacitor are employed in series across terminals 87 and 89, a lower resistance value (which would cause turn-off, if employed without the capacitor) can be included without any apparent effect.

Thus, it would appear that both a full-wave rectified DC current and an AC current effect are encountered, in the circuit for the bridge means 91 and 92. The capacitor 92 functions to block the DC current which exists between terminals 87 and 89 while passing the smaller AC current which may also effect turn-off of the SCR's 62 and 72. A resistor 91 must be included and apparently be sufficient to reduce the AC current to a value below that causing turn-off of the SCR's 62 and 72 whereupon the capacitors 64 and 74 discharge below the firing potential.

Thus, with the resistor 91 in series with capacitor 92 adjusted slightly above the value required to eliminate a turn-off reaction of the SCR's 62 and 72, in its shorting between terminals 87 and 89, substantially simultaneous turn-off may be accomplished by shorting between terminals 87 and 88 or between terminals 88 and 89, and establishment of an alternating current path is provided by the transmitting bridge means 91 and 92. If either of the load diodes 80 or 81 is respectively shorted out of the circuit, cut-off of the SCR 72 or 62 (where the short exists) occurs in the same manner as described in FIG. 1, and the other SCR respectively 62 or 72, is cut-off by the AC current increase through the bridge means 91 and 92. In other words, if a short occurs between 88 and 89, SCR 72 will be turned-off because capacitor 74 discharges in the afore established manner, as well as causing discharge of capacitor 64 by its non-directional connection with terminal 88 through resistor 91, capacitor 92 and the shorting means which assures turn-off of SCR 62.

The neon glow lamp 93 is in parallel with capacitor 92 which controls the firing potential of lamp 93 in a manner familiar in the art, particularly with respect to the common relaxation oscillator circuits. A turn-off of the SCR's 62 and 72 caused by a short across any two of the three terminals 87, 88 and 89, will cause lamp 93 to fire and to subsequently conduct a portion of the turn-off current. Without the resistor 95, i.e., with switch 96 closed, the voltage level across the lamp 93 is sufficient to maintain lamp 93 in an on or latched condition even after the short is removed whereby no power is delivered to the load until the neon lamp 93 is momentarily turned-off to reestablish the original state. Opening re-set switch 96 momentarily causes the voltage to drop to a level to extinguish lamp 93 and after charging of capacitors 64 and 74, power is restored to the AC proper load 61, whereupon switch 96 may again be closed to reset for automatic latching.

If resistor 95 is included in series with resistor 94, i.e., the switch 96 is in open condition, a reduction of the voltage across lamp 93 may be made sufficient to avoid the aforementioned latching effect, after a short has been removed which caused a turn-on of glow lamp 93 and subsequent shunt conductance of turn-off current. Thus, when the short has been removed, the voltage drops across lamp 93 sufficiently to cause cut-off of lamp 93 and automatically reestablishes the conditions of the supply circuit 60 to deliver power to the proper AC load circuit 61, i.e., after refiring of SCR's 62 and 72. Any short in the bridge means 91 and 92 or in lamp 93, effects a cut-off of the SCR's 62 and 72.

It is to be noted that in practice, a greater resistance value of resistor 91 in series with the capacitor 92 is required to avoid unwanted turn-off when a lower AC source 90, for example, 105 volts, is encountered and a lesser resistance value may be used when a higher source is used, for example 120 volts. It should be apparent that certain other electrical devices having similar breakdown trigger characteristics could be employed rather than the neon tube.

The capacitor 92 in the bridge arrangement of FIG. 3 connected between 87 and 89, may be eliminated when the neon glow lamp 93 is included. Such an arrangement may provide simultaneous turn-off of the two SCR circuit sides when one side is shorted, and provide both automatic reset and latching functions. At levels of higher series resistance permitting automatic reset, i.e., 400 K ohms and higher, turn-off is incomplete and unsatisfactory for most purposes. Appreciable motor starting load surges and the like, at both latching and automatic reset levels of resistance; tend to trigger turn-off. This is advantageous whenever a sensitive means of surge protection is required, but is considered undesirable in the normal instance particularly when inductive load effects are present. Use of the neon lamp in the bridge circuit produces similar results even when the capacitance is included, but since the resistance-capacitance series combination alone can be relied upon to accomplish simultaneous turn-off, higher resistance, such as the value of the FIG. 3 resistor 95 (500,000 ohms) may be employed to control the neon response or it may be omitted if latching is not desired. A neon lamp in a low series resistance circuit for latching purposes provides substantially complete turn-off and reset may be conveniently accomplished by the tool or appliance control switch if turned off and then on again.

If a proper DC load circuit 98, as shown in FIG. 4, were to be connected to a supply circuit in accord with this invention, such circuit could be identical to supply circuit 60 shown in FIG. 3, except resistors 91, 94 and 95, capacitor 92, neon lamp 93, and switch 96, together with their connections, could be safely eliminated. Thus, a full-wave DC supply circuit would be produced for powering load circuit 98. In this system, shorting of one side would leave the other side functional and capable of supplying half-wave current to the load. Caution must be exercised, however, since connecting a proper AC load circuit 61 accidentally into such a supply circuit intended for DC only could produce hazardous conditions due to the omission of the aforementioned bridge means 91 and 92 and its protective function. While an AC circuit including the bridge means may be tested by shorting any two of the three terminals, two switches, one between terminals 87 and 88 and the other between 88 and 89 could be employed in such a modified full-wave DC supply circuit for testing between hot and ground on each side to verify individual functioning and steps should be taken in either case to make certain that the ground is connected to terminal 85 of the proper load circuit 61 and terminal 99 of the proper load circuit 98. Other protective factors have and should be considered, but are not disclosed herein due to the emphasis on the basic arrangements.

Another embodiment of the invention is shown in FIG. 5 in which SCR's 100 and 101 when fired provide slave triggering for respective SCR's 102 and 103, as is common in the art. In this manner SCR's 100 and 101 may have small current capacities, for example, 6 amps, while SCR's 102 and 103 may carry very large current, for example, 500 amps. The operation of the circuit shown in FIG. 5 is thus essentially the same, as previously described in FIG. 3. The resistances 104 and 105 are added in series with anodes 106 and 107 of respective SCR's 100 and 101 to provide current limiting for the gates of the slave SCR's 102 and 103 and to provide a proper voltage range for the operation of component failure monitors, as hereinafter more fully described in connection with FIGS. 6A and 6B.

Figure 6A:
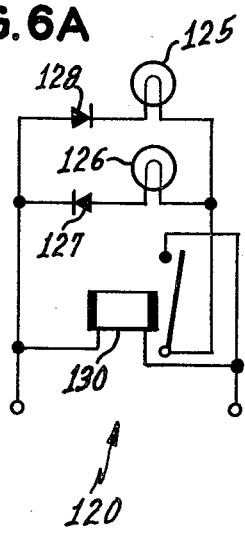
FIGS. 6A and 6B are circuit diagrams of two different fault monitors in accord with this invention which may be used in either of the circuits of FIGS. 3 or 5.
Figure 6B:
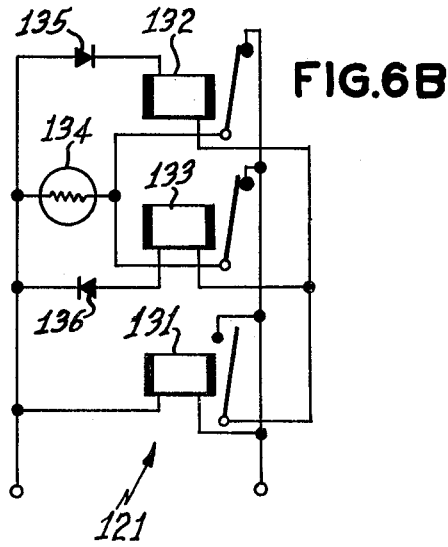

The component failure monitor circuits 120 and 121, generally depicted in respective FIGS. 6A and 6B, in accord with this invention, may be coupled across the AC load 122 at terminals 123 and 124 and are shown in their off conditions with the power switch 119 in open condition. The monitor circuit 120 is seen to include a pair of incandescent bulbs 125 and 126 and series connected diodes 127 and 128. With the power on, the relay 130 closes the contacts and bulbs 125 and 126 are activated. When a component failure causing a short then occurs in the supply circuit, particularly, shorting of either diodes 116 and 117, or any of SCR's 100, 101, 102, and 103, the armature contacts in the relay 130 will chatter and provide an audio indication of a shorting component fault in the supply circuit and the frequency and phase of such contact chatter tends to eliminate or greatly diminish the current flow to one of the bulbs 125 or 126, depending on whether such shorting component fault occured in left half or the right half of the full wave supply circuit, as seen in FIG. 5, thus providing a visual indication of the location of such fault or shorting failure.

The monitor circuit 121 of FIG. 6B employs relays rather than bulbs of FIG. 6A and functions to generally pass a high enough current, indicative of the component shorting fault, to both sides of the supply circuit thereby interrupting the current supply as by blowing or destroying the fuse means 114 and 115, such fuse means being in the nature of fuses circuit breakers, or other overload protection devices known in the art.

If a shorting fault occurs in the supply circuit, particularly, shorting of either of the diodes 116 and 117, of any of the SCR's 100, 101, 102 and 103, relay 131 will buzz or chatter causing same to alternately open and close circuit apparently at or near current frequency and either relay 132 or 133 would be permitted to close which puts a short across the load blowing out both fuses 114 and 115. It is to be appreciated, that with 121 connected across the AC load 122, and the AC load and supply circuits are coupled prior to closing switch 119, the monitor is in a shorting indicative condition. Thus a delay means, in the form of a negative thermal coefficient thermistor 134, permitting full shorting only after a predetermined and brief hesitation, is required to permit proper charging of the gate capacitors which fire SCR's 100 and 101, which in turn fire SCR's 102 and 103 to energize the coils of relays 132 and 133 thereby removing the short. Diodes 135 and 136 are series connected to the coils of the respective relays 132 and 133 and provide proper selective current paths for the monitor 121.

A sensitivity range of voltages to permit proper operation of either of the monitors 120 and 121 can be determined by varying the AC source voltage 118. Similarly with a predetermined range of source voltage, resistors 104 and 105 can be selected to drop the voltage to a proper value within such range of voltages. Failure on one SCR 100 or 102 in one side and 101 or 103 in the other side, either by shorting or with retention of its rectification capacity without being capable of turn-off, will effect an apparent depressive condition in the performance of the SCR's in the other side. This effect is not fully understood but is readily detectable by a simple AC relay, such as relay 130 of FIG. 6A, connected in parallel with the AC load 122 of a full wave AC supply circuit. The relay 130 thus buzzes or chatters to indicate a loss of protective function apparently at the frequency of the AC supply 118. While there is no apparent power loss in an incandescent load, or in a universal motor, a synchronous motor ceased operating in the component failure testing thereon thus far accomplished. Regardless of how or why the monitor 120 operates, the results are valuable in that warning reaction is obtained by the monitor to indicate a shorting of either diodes 116 and 117 or any of the SCR's 100, 101, 102 and 103. Thus, any shorting failure that would normally be encountered and result in a restoration of normally dangerous circuit conditions, which could result in the electrocution of a person who became the short across any two or three of such terminals or exposed conductors between the supply circuit and the load circuit, would be indicated by the monitor 120, or result in immediate cut-off of the current from source 118 in accordance with the effect of monitor 121. Corrective action would then be taken to restore the safe or protecting properties of the circuits in accord with this invention and in accord with generally recognized safe electrical practices.

The designations of "DC Load" and "AC Load" in the drawings is not intended to unnecessarily limit the types of loads which would or would not operate in the various circuits disclosed. For example, an inductor and resistor could be connected as the "DC Load" 14 in the FIG. 1. If an AC motor were connected as the load 14, the motor would not operate, but current would pass therethrough. Thus, the designations "DC Load" and "AC Load" are intended to mean respectively that substantially half-wave direct current and full-wave alternating current are available to the respective loads from the supply circuits 20 and 60. It is also understood that current from the alternating current sources may be changed or adjusted in the relative magnitude and/or duration of forward and reverse cycles or positive and negative cycles for obtaining various design advantages therefrom.

It is to be noted that protection against component failure may be achieved by, for example, use of two or more SCR's in series in a single trigger circuit, or in paralleled separate trigger circuits, or by two or more complete circuits in series, the latter arrangement requiring more sensitive SCR gates, as would occur to those persons skilled in the art. Furthermore, an increase in the gate circuit resistance of a given SCR increases its sensitivity to turn-off and requires less fault current to trigger a turn-off while a decrease in the resistance lessens the sensitivity of a given SCR and requires a greater fault current for triggering a turn-off. With a fixed gate circuit resistance, increased inherent gate sensitivity in an SCR decreases sensitivity to turn-off fault currents while decreased inherent gate sensitivity increases sensitivity to fault currents.

An exemplary embodiment of the circuit components of FIG. 1 is seen to include the following parameters:

| | |
|---|---|
| diode 10 | 3 amp, Archer, 400 PIV |

-continued

| | |
|---|---|
| diodes 26 and 28 | 1 amp, Archer, 400 PIV |
| SCR 18 | Archer E/c/c 331,BO 1052, 6 amp, Thermotab |
| capacitor 24 | 0.033 mfd. |
| resistor 25 | 740,000 ohms |
| thermistor 31 | Globar Fr.49 |
| fuse 32 | 3 ampere |

The parameters of FIG. 2 are as follows:

| | |
|---|---|
| SCR's 45 and 49 | same as SCR 18 |
| resistor 46 | 3.3 megohms |
| resistor 50 | 3.8 megohms |
| diodes 47 and 51 | same as diodes 26 and 28 |

The parameters of FIG. 3 are:

| | |
|---|---|
| SCR's 62 and 72 | same as SCR 18 |
| resistors 65 and 75 | 1.2 megohms |
| capacitors 64 and 74 | same as capacitor 24 |
| diodes 66, 67, 76, and 77 | same as diodes 26 and 28 |
| diodes 80 and 81 | same as diode 10 |
| resistor 91 | 330,000 ohms |
| resistor 94 | 100,000 ohms |
| resistor 95 | 500,000 ohms |
| capacitor 92 | 0.022 mfd. |
| thermistor 63 and 73 | same as thermistor 31 |
| fuse 68 | 5 ampere |
| Neon lamp 93 | $NE^2$ neon glow tube |

The FIG. 4 diodes are all the same as diode 10.

FIG. 5 parameters are the same as the FIG. 3 parameters, except as follows:

| | |
|---|---|
| SCR 102 | Motorola HEP 306, 15 amps |
| SCR 103 | Motorola HEP 307, 15 amps |
| resistor 104 | 45,000 ohms |
| resistor 105 | 52,000 ohms |
| diodes 108 and 109 | 15 amps |
| diodes 110, 111, 116 and 117 | same as diodes 26 and 28 |
| thermistors 112 and 113 | 15 amp thermistor(special order) |
| fuses 114 and 115 | 15 amp fuses |

The parameters of FIGS. 6A and 6B are:

| | |
|---|---|
| diodes 127 and 128 | same as diodes 26 and 28 |
| lamps 125 and 126 | 7½ watt incandescent pilot or $NE^2$ neon glow tube |
| relay 130 | Archer, 115 v AC, coil/2200 ohms- current 20 ma; contacts/3 amps |
| thermistor 134 | same as thermistors 112 and 113 |
| diodes 135 and 136 | same as diodes 26 and 28 |
| relay 131 | same as relay 130 |
| relays 132 and 133 | same as relay 130 but with contacts/ 15 amps |

FIGS. 7 through 13 are directed to circuit modifications including protective connections for conductive load housings to be employed with the circuits disclosed in FIGS. 1, 3 and 5 as an alternative to simple grounding of the normal load housing, including 14', as is common in the prior art. Such a connection is considered advantageous in accord with this invention in providing for automatic shut-off of the supply in the event of an internal short to the load housing and prevents the housing from providing a dangerous ground path if other current sources should be contacted by the housing or the person holding same. While the protective connection is discussed in reference to the load housing 14' or other enclosure, it should be noted that the supply housing may also be connected with the load housing or be substituted therefor. In each instance, the load housing, for example 14', is connected to the supply circuit in such a way that the grounding of the housing either directly or through a shorting medium, such as the human body, permits a current flow in a direction opposite to the direction of the load powering flow. This reverse current flow of comparatively small or feeble current triggers a turn-off of the SCR switching means thereby terminating power current flow until the SCR again fires. Inadvertent contact of a tool (drill or saw or the like) with concealed water pipes, conduits and other grounded obstructions, which is powered and connected in accord with FIG. 7, causes a turn-off of the tool before any appreciable damage occurs. Internal shorting of the power leads to the tool housing also permits the reverse current flow that triggers the protective turn-off of the SCR switching means in the manner fully explained in connection with FIG. 1.

The housing connection may be made by means other than the indicated resistance 14", such as a small value capacitance 98''' (FIG. 13) or a reverse oriented unidirectional blocking diode 98" (FIG. 12), i.e. a blocking diode conductive in a direction opposite to the conduction of the SCR. A resistance 14" with a nominal value of, for example, 100K ohms, is the preferred means because of its reliability and its mode of normal failure. Coupling may consist of a simple connecting lead in many instances, but use of such a resistance 14" or other current limiting coupling offers protection for any substantial current flow therethrough even in the event of shorting of the SCR or insensitivity thereof to turn-off conditions.

FIG. 7 depicts the load arrangement of FIG. 1 with the resistance 14" coupled to the housing 14' enclosing both the DC load 14 and blocking diode 10. A ground fault turn-off reaction is produced when connection is made between ground and any point in the circuit between diode 10 and the SCR with trigger circuit that constitutes the supply. It is apparent that diode rectifier 10 could be located on the other side of load 14 and that some obvious advantage would be gained by such location, since ground fault protection would be extended to load 14 and any point between the diode 10 and load 14. The depiction of the diode 10 on the hot side of DC load 14 in FIG. 1 was made to facilitate a ready recognition of half-wave circuit inclusion in the full wave AC supply circuit 60 shown in FIG. 3. Location of the diode 10 on the ground side of the DC load 14 is restricted to the half-wave circuitry, as will be apparent to those skilled in the art in consideration of FIGS. 3 and 5. FIG. 8 depicts the half-wave load circuit with preferred half-wave placement of diode 10 and a resistance 14" coupling load housing 14' which encloses both load 14 and diode 10. While ground access may be provided as a convenience within the supply enclosure, it may also be advantageous to provide ground access externally, for example, for a single conductor transmission line.

If it were desired to have only a simple "ground fault" protector without the line-to-line load fault protection, i.e. between 21 and 22, that can be obtained in accordance with this invention, the blocking diode 10 can be located between contact 22 and the ground side of source 15 and most conveniently within the supply enclosure 20' of supply circuit 20 thereby preventing housing 14' and/or 20' from providing a live source or a dangerous ground path. FIG. 9 depicts the half-wave arrangement of FIG. 1 modified for "ground fault" protection only and having a resistance 14" coupling load housing 14', which encloses only the DC load 14, and coupling supply housing 20' thereto.

FIG. 10 depicts the AC full-wave load circuit of FIG. 3 with a resistance 82" coupling the housing 82' enclosing AC load 82 and bridge diodes 80 and 81.

FIG. 11 depicts the AC load circuit of FIG. 3 modified to provide a system in which the housing 82' encloses the AC load only and the diodes 80 and 81 may be provided within the socket at the end of an extension cable connected to the supply at its plug end, or otherwise repositioned or transferred to the supply circuit and/or its enclosure, as would be obvious to a person skilled in the art. This system provides no direct ground or line-to-line fault protection for the load circuitry, except to the end of such extension cable, but in providing a housing 82' properly coupled by resistance 82" to the supply circuit, protection is provided against load circuit shorting to the housing 82' and ground-fault protection is also provided for such housing.

FIG. 12 depicts the DC load circuit 98 of FIG. 4 with a reverse oriented blocking diode 98" coupling housing 98' which encloses the DC load and the four diodes of its bridge circuit.

FIG. 13 depicts the DC load circuit of FIG. 4 with a capacitance 98'" coupling housing 98' which encloses the DC load only, with the four diodes of the bridge repositioned or transferred to the supply circuit and/or its enclosure.

Intentional shorting of supply leads to ground in the protective circuitry, described in connection with FIGS. 1, 3 and 5 may be accomplished by means of a test switch, including switch 200, to confirm proper circuit functioning. Such testing shorts should be made through a cushioning resistance, including resistance 201, in order to minimize the possible ½ cycle surge that may occur when a shorting contact is immediately established during a period of forward conductance. An additional advantage is obtained if the cushioning resistance is a Negative Thermal Coefficient type with appropriate characteristics, such as the Globar Fr. 49, also employed as series surge limiter 31 in FIG. 1. If test shorting is made through such a resistance and the circuit turns off in a normal manner, negligible heating effect is produced. If the turn-off does not occur, as in the event of a circuit malfunction, the N.T.C. resistance element 201 heats rapidly dropping the resistance to near zero to overload the fuse of the circuit, such as fuse 32 of FIG. 1, thereby disarming the circuit automatically. If the test switch 200 is employed as the on-off circuit control, testing with an automatic disarming capability is accomplished with and during each turn-off when the test switch is closed. In many instances, such as the control of a hand tool, a normally closed pushbutton switch may be employed, with a turn-on of the tool accomplished upon opening such a switch. FIG. 14 depicts the load circuit of FIG. 1 with N.T.C. resistance 201 and normally closed control-test switch 200 in series across load terminals 12 and 13. Such an arrangement would normally be enclosed within the load housing, but the resistance and switch could also be placed across the supply terminals 21 and 22 and placed within the housing enclosing the supply, if desired.

FIG. 15 depicts the N.T.C. resistance 203 and control-test switch 202 positioned across load terminals 84 and 85 although they could be connected across the other pair of load terminals 85 and 86 or either pair of supply terminals 87 or 88 and 89.

FIG. 16 depicts the full-wave DC load and diode bridge circuit 98 of FIG. 4 with dual N.T.C. resistances 204 and 206 and dual switches 205 and 207, which obviously may be combined in a D.P.D.T. type switch controlling the testing of both sides simultaneously. While one switch 202 and resistance 203 is effective in testing and providing disarming potential for both sides of the AC arrangement of FIG. 15, dual provision must be made in the DC full-wave circuit of FIG. 16, since the two sides are isolated from each other by the four diodes of the DC bridge.

Where large current requirements prohibit a practical use of the N.T.C. resistance, an initial higher resistance shorting followed by a rapid establishment of either a short or a low resistance short may be accomplished in any well known manner, such as those illustrated in FIGS. 17 and 18. FIG. 17 depicts a switch 210 having two contact leaves 211 and 212 designed to make successive closure in a make-then-make arrangement so that the resistance 213 coupled to leaf 212 establishes contact a short time before the essentially zero resistance contact by leaf 211. FIG. 18 depicts a thermostatically closed switch 215 of the type commonly employed as a lamp blinker connected in series with the control-test switch 216. Closing of the control-test switch 216 will accomplish turn-off of an operative circuit through the resistance 217 of the heating element without appreciable heating, but if turn-off does not promptly and properly occur due to a faulty circuit, the element will rapidly heat and create a near zero resistance short of sufficient duration to disarm the faulty circuit.

Sometimes, a plug-in or switch controlled turn-on of the supply circuit momentarily results in a surge of current being supplied to the load even with a shorting turn-off resistance placed across the load terminals. This surge of current may be effectively eliminated if full empowerment of the supply circuit is slightly preceeded by a limited current connection to establish an off-state. FIG. 19 depicts one manner of accomplishing the above — a supply control switch 220, which corresponds to either switch 23 of FIG. 1 or switch 69 of FIG. 3, with a small capacitance 221 in shunt position to assure limited current flow in the circuit before full switch closure. A resistance, if desired, may be employed rather than capacitor 221 to accomplish substantially the same results. FIG. 20 depicts a grounded type 3 prong wall plug 225 with a slightly shortened ground side blade 226. This plug 225 permits an initial limited current flow through the longer hot side blade 227 and the round grounding prong 228 which connects the circuit through a capacitor 229 to ground, or, as previously stated, a resistance may be used rather than capacitor 229. Full current flow is thus available slightly later as the shortened ground side blade 226 also makes contact with the grounded side of the current source.

FIG. 21 depicts a circuit similar to that of FIGS. 1 and 7, but with a particular location of the proper load diode 230, corresponding to diode 10 of FIGS. 1 and 7, positioned between the load and SCR 18 and its trigger circuit, either made adjacent to the supply or included within the supply enclosure 236. A control and/or a test switch 231 and series N.T.C. resistance 232 connects the ground to the hot side between the load diode 230 and the SCR 18 with its control circuit that constitutes the supply circuit. This circuit may be employed to supply a half-wave DC load without ground-fault protection or line-to-line protection for the power leads, but with shielding supplied by a housing 233 and a resistance 234 coupled to that point between the load diode 230 and the SCR 18 with its control circuit, resistance 234 also being connected, to enclosure 236 in the same manner that resistance 14'' is connected to load housing 14° and supply housing 20' in FIG. 9. A rather unusual and unexpected use for the circuit arrangement of FIG. 21 is that of a shock weapon for animal or personnel control in which the load is the intended shock recipient and in which the coupling from resistance 234, more normally made to the load housing, is made to the operator most conveniently through contact with supply enclosure 236. Circuit completion for the shock recipient may be accomplished by connection through diode 230 with the supply and to its contained ground terminal or any other external ground. The coupling supplied to the operator by means of convenient conductive contact affords automatic turn-off protection from the shock effect should the operator contact the supply electrode 21, the ground 22 or a shock recipient which constitutes the DC load. For such a shock weapon, an optional current limiting resistive load 235, such as an incandescent lamp, should be placed in series with the SCR circuitry to protect the circuit in the event of overload due to shorting.

If the load selective blocking diode 230 of FIG. 21 or diode bridge of some of the other circuits is to be located within the supply enclosure in an embodiment of this invention that provides modified protection, certain by-pass connections may be conveniently made that relieve the blocking diode or diode bridge of its major current carrying functions and permit the usage of a smaller capacity diode. A portion of the half-wave circuitry of FIG. 21 is shown in FIGS. 21A and 21B which would accomplish the intended results (FIG. 1 could be modified by transferring the diode to its supply enclosure, as shown by 230 in FIG. 21). If a connection 237 is made between the anode of the SCR 18 and the anode of diode 230 (and the lead connecting the anode of the SCR 18' with the cathode of diode 230' is removed) the major portion of the current is shunted away from diode 230' which then will carry only the currents of the SCR trigger circuitry. This modification does not prevent the use of the test switch 231', but it does eliminate the automatic diarming function of the N.T.C. resistance, identical to resistance 232 and connected in the same manner. Similarly in FIG. 3 if the anode of SCR 62 and the cathode of SCR 72 are connected directly to the connection point between diodes 81 and 80 and disconnected from that shown in FIG. 3, turn-off is still accomplished by the usual shorting of any two of the standard three leads, as previously described, but the two additional leads to the connection point of 80 and 81 are unprotected and cannot be safely contacted. Such a shunting of the blocking diode or diodes 80 and 81 by direction connection of the SCR flow of current to the load 82 is of advantage only in the special circuit in shich a blocking diode or a diode bridge is closely associated with the supply circuit and most ideally located within the supply enclosure so that such shunting can be accomplished in an easy manner therewithin as seen most clearly in FIG. 21B. Neither ground-fault protection nor line-to-line protection is offered for the power leads to the load, but the current turn off previously described in accordance with the invention is triggered by fault currents passing through the coupled supply housing 236' and/or load housing 233 (FIG. 21) through resistance 234' and lead 238 to the SCR trigger circuit.

Blocking diode 230' of the SCR trigger circuit of FIG. 21B is merely more directly connected to ground than in FIG. 21A, and this is possible in that the diode 230' connecting the SCR trigger circuit to ground, as in FIGS. 21A and B no longer carries the load current, as in other circuits previously described; therefore, smaller capacity diodes (i.e., current carrying) may be employed.

In summary of the description of FIGS. 21A and B, it is to be understood that the load current carrying connections from a proper load, i.e., a load including its identifying proper load diode, to SCR and the SCR trigger supply circuit are compatible and may employ a single conductor (and a ground conductor) thus affording a fault current control through engagement with the load current carrying lead. If the load current leads are not to be given direct protection in the manner hereinbefore described turn-off capability of the SCR, in accordance with this invention (by the described shunting of 230' diode providing a reverse flow of current to the SCR trigger circuitry, may be employed independently and may be adapted to a variety of applications. If the trigger circuitry on the load side of the SCR, as seen in FIGS. 21A and B is disconnected from the power lead and the blocking diode 230' removed from the power lead, the trigger circuit lead 238 may be reconnected through the blocking diode 230' to the load connection, as in FIG. 21A, or directly to ground, as in FIG. 21B, lead 238 retaining its capability of turn-off reaction to reverse flow, but not its ability to cause a turn-off reaction to reverse flow in the event of inadvertent ground contact or external ground fault connections to the power lead from the SCR to the load, as in FIGS. 1, 7, 8 and 9. In the more simple switching arrangements of FIGS. 21A and 21B, the reverse flow to the SCR trigger circuitry may originate in a load housing 233 (FIG. 21) and/or supply housing 236' through inadvertent contact with the SCR to load lead 237 or through inadvertent grounding of either housing.

The same modifications of blocking diode relocation, corresponding to diode 230 or 230' of FIGS. 21 or 21A and 21B, may be made in the full-wave circuits of FIGS. 3 and 5, as would be obvious to a person skilled in the art.

FIG. 22 depicts a load circuit for half-wave DC supply, such as is shown in FIG. 1, in which a filter capacitor 240 is used to provide a somewhat modified source of alternating current. The capacitor is placed in parallel with the DC load 241, but in series with an AC load 242. The charging and discharging of the capacitor 240, controlled by the pulsating DC of the supply, creates the AC availability to the AC load 242. Shorting of the AC load simply creates a more normal filtering function for the capacitor 240 with respect to the DC load 241.

FIG. 23 depicts a load circuit for a supply such as shown in FIG. 1 in which a time delay relay 250 or the like controls the power to the DC load. This circuit offers protection in the event that contact with a partially disconnected proper load is made that places an improper load in series with the proper one and its identifying diode, i.e., a warning current, limited by the delay control circuitry of the relay 250, is passed before the switching of the load current and, if the improper load has an appreciable resistance, the closure of the relay 250 may be delayed indefinitely. Relay 250 may be a Magnecraft W211ACPSOX-5, or any other well known time delay relay. FIG. 24 depicts a non-polarized half-wave load circuit 260 in which unidirectional current is supplied to a DC load. Such load circuit 260 is an alternative to the load circuit of FIG. 2, which is also non-polarized but which is capable of supplying current in either direction to the DC load as determined by its orientation with respect to the supply circuit.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a power system the combination comprising a load circuit having a load and a unidirectional blocking means connected in series to said load for passing substantial current in one direction through said load and passing substantially no current in the opposite direction, and a supply circuit connected to said load circuit and adapted to connect said load circuit to an alternating current source, said supply circuit including a unidirectionally triggered switching means for supplying current from the alternating current source to said load circuit in said one direction, said supply circuit further including means operatively connected to said switching means for substantially reducing the current flow through said switching means in said one direction whenever a load circuit providing current flow in said opposite direction is connected to said supply circuit.

2. The system as defined in claim 1 wherein said switching means is a thyristor.

3. The system as defined in claim 2 wherein said blocking means is a rectifier.

4. The system as defined in claim 3 wherein said means for substantially reducing the current flow includes a capacitor for triggering the gate of said thyristor, said capacitor discharging below the firing potential whenever a load circuit providing current flow in said opposite direction is connected to said supply circuit.

5. The system as defined in claim 4 wherein said means for substantially reducing the current flow includes a rectifier connected between the gate and anode of said thyristor and oriented in said opposite direction.

6. The system as defined in claim 4 wherein said supply circuit further includes a resistor connected between the gate and anode of said thyristor and having a resistance value sufficiently high to maintain the firing angle of said thyristor substantially at 180 degrees, the RC time constant of said resistor and capacitor being greater than one half-cycle of the alternating current source.

7. The system as defined in claim 1 further comprising another load circuit having a pair of input terminals and another load connected to one said terminal, a pair of unidirectionally triggered switching means connected in parallel with the orientation of each reversed from the other, said pair of switching means being connected in series with said other load and to said other terminal whereby current may pass through said other load in either direction depending upon the direction of connection that exists between said pair of input terminals of said other load circuit and said supply circuit.

8. The system as defined in claim 7 wherein said pair of unidirectional switching means is a pair of thyristors.

9. The system as defined in claim 8 wherein a pair of means is connected respectively between the gate and anode of said pair of thyristors for controlling the firing potential thereof.

10. The system as defined in claim 1 further comprising an auxiliary load circuit having another load in series with another unidirectional blocking means oriented in said direction and connected in parallel with said load circuit whereby substantially half-wave current is delivered to said other load.

11. The system as defined in claim 1 further comprising another load circuit having a pair of input terminals, a pair of unidirectionally triggered switching means connected in series between said input terminals with the orientation of each reversed from the other, a pair of unidirectional blocking means connected in series between said input terminals with the orientation of each reversed from the other and the orientation of said pair of blocking means reversed from said pair of switching means, a load connected between a juncture of said pair of unidirectionally triggered switching means and a juncture of said pair of unidirectional blocking means whereby a unidirectional current may pass through said load.

12. The system as defined in claim 1 further comprising a conductive housing and means for electrically connecting said housing to one of said circuits.

13. The system as defined in claim 12 wherein said means for electrically connecting is a resistance.

14. The system as defined in claim 12 wherein said means for electrically connecting is a capacitance.

15. The system as defined in claim 12 wherein said means for electrically connecting is a reverse oriented blocking diode.

16. The system as defined in claim 12 wherein said housing is said load circuit housing and said one circuit is said load circuit.

17. The system as defined in claim 12 wherein said housing is said load circuit housing and said one circuit is said supply circuit.

18. The system as defined in claim 12 wherein said means for electrically connecting is connected to the junction between said means operatively connected to said switching means and said unidirectional blocking means.

19. The system as defined in claim 1 further comprising a conductive load housing and a conductive supply housing and means for electrically connecting one of said housings to one of said circuits.

20. The system as defined in claim 19 wherein said means for electrically connecting said one housing to said one circuit connects the other of said housings to said one circuit.

21. The system as defined in claim 19 in which said unidirectional blocking means is located in said load housing.

22. The system as defined in claim 19 in which said unidirectional blocking means is located in said supply housing.

23. The system as defined in claim 1 further comprising a test shorting means connected between said load and supply circuits for providing an initial high resistance short thereacross and immediately thereafter a lower resistance thereacross.

24. The system as defined in claim 23 wherein said shorting means includes an N.T.C. resistance.

25. The system as defined in claim 23 wherein said shorting means includes switch means having a two stage sequential closure with the first stage being a higher resistance contact than the second stage.

26. The system as defined in claim 23 wherein said shorting means includes a thermal switch.

27. The system as defined in claim 1 further comprising control means for limiting the current from said supply circuit to said load circuit.

28. The system as defined in claim 27 wherein said control means includes means for delaying the flowing of full load current from said supply circuit to said load circuit.

29. The system as defined in claim 28 in which said means for delaying is a time delay relay.

30. The system as defined in claim 1 further comprising a filter capacitor and an AC load connected in parallel with said load.

31. In a power system the combination comprising a proper load circuit having a load and a unidirectional blocking means connected in series to said load for passing substantial current in one direction through said load and passing substantially no current in the opposite direction, and a supply circuit including a gate controlled rectifier means adapted to be connected to an alternating current source for supplying current in said one direction, said proper load circuit being connected to said supply circuit, said rectifier means conducting after said load circuit is connected to said supply circuit, said rectifier means thereafter becoming non-conducting upon connecting an improper load to said supply circuit which provides current flow in said opposite direction.

32. The system as defined in claim 31 wherein said supply circuit includes a capacitor for triggering the gate of said controlled rectifier means, said supply circuit including a resistor connected between the gate and anode of said controlled rectifier means and having a resistance value sufficiently high to maintain the firing angle of said controlled rectifier means substantially at 180°, the RC time constant of said resistor and capacitor being greater than one half-cycle of the alternating current source.

33. The system as defined in claim 31 wherein said gate controlled rectifier means is a thyristor.

34. The system as defined in claim 33 wherein said supply circuit includes a capacitor for triggering the gate of said thyristor and a rectifier connected between the gate and anode of said thyristor and oriented in a direction opposite to said one direction for discharging said capacitor below the firing potential whenever a load providing current flow in said opposite direction is connected to said supply circuit.

35. In a power system the combination comprising a proper load circuit having three input terminals with a pair of unidirectional blocking means respectively connected to two of said input terminals and oriented in the same current carrying direction, said proper load circuit having a load connected between said pair of blocking means and adapted to be coupled to the other of said input terminals, and a supply circuit having three output terminals respectively connected to said three input terminals and including a pair of unidirectionally triggered switching means adapted to be connected to an alternating current source for supplying current in said direction, one of said unidirectional blocking means passing one half-cycle of current from the source through said load and through one of said unidirectionally triggered switching means back to the source while the other of said unidirectionally triggered switching means passes the other half-cycle of current from the source through the other of said unidirectional blocking means and through said load back to the source whereby substantially full wave current is delivered to said load from the source, means operatively connected to said pair of switching means for substantially reducing the current flow through at least one of said pair of switching means to substantially terminate current flow through an improper load circuit whenever an improper load circuit providing current flow in a direction opposite to said current carrying direction is connected to said supply circuit.

36. The system as defined in claim 35 wherein an auxiliary load circuit having another load in series with another unidirectional blocking means oriented in said direction may be connected in parallel with said load and one of said pair of unidirectional blocking means whereby substantially half wave current is delivered to said other load.

37. The system as defined in claim 35 wherein said pair of unidirectional blocking means have a common juncture with said load being connected between said juncture and said other input terminal whereby full wave alternating current is delivered to said load from the alternating current source.

38. The system as defined in claim 37 wherein said means for substantially reducing the current flow includes a resistor and capacitor in series connection across two of said output terminals connected respectively to said two input terminals 39. The system as defined in claim 38 wherein each of said unidirectionally triggered switching means is a thyristor, and each of said blocking means is a rectifier.

40. The system as defined in claim 39 wherein said supply circuit includes a pair of capacitors for triggering the gate of respective said thyristors and another rectifier connected between the gate and anode of each said thyristor and oriented in a direction opposite to said one direction for discharging said capacitor associated with respective said thyristor below the firing potential whenever a load circuit omitting said rectifier is connected to said output terminals of said supply circuit.

41. The system as defined in claim 38 further comprising a gaseous discharge bulb and a series connected reset switch in parallel with said capacitor.

42. The system as defined in claim 41 further comprising a resistor in parallel with said switch.

43. The system as defined in claim 37 further comprising a monitor circuit connectable in parallel with said load and operable upon functioning failure of said unidirectionally triggered switching means, said monitor circuit including means indicative of such failure to warn of the dangerous condition thereof.

44. The system as defined in claim 43 wherein said supply circuit includes supply current interrupting means connected in series with said pair of unidirectionally triggered switching means, said means indicative of such failure including means for activating said interrupting means to prevent current flow from the alternating current source.

45. The system as defined in claim 43 wherein said means for activating said interrupting means includes delay means for delaying activation of said interrupting means a predetermined time greater than the time in which the monitor would be made operable by transient conditions.

46. The system as defined in claim 43 wherein said means indicative of such failure includes means for audibly indicating such failure.

47. The system as defined in claim 43 wherein said means indicative of such failure includes means for visually indicating such failure.

48. The system as defined in claim 43 wherein said means indicative such failure includes a relay energizable by alternating current.

49. The system as defined in claim 43 wherein said supply circuit includes a resistor in series with each of said triggered switching means for providing appropriate voltages to permit proper monitor operation.

50. The system as defined in claim 37 wherein each of said switching means is a thyristor, and said means for substantially reduced the current flow includes a resistor and capacitor in series connection across two of said output terminals connected respectively to said two input terminals.

51. The system as defined in claim 35 further comprising a conductive housing means and means for electrically connecting said housing means to one of said circuits.

52. The system as defined in cliam 51 wherein said means for electrically connecting is a resistance.

53. The system as defined in claim 51 wherein said housing means includes a load circuit housing and a supply circuit housing.

54. The system as defined in claim 35 wherein each of said switching means is a thyristor.

55. The system as defined in claim 54 wherein each of said blocking means is a rectifier.

56. The system as defined inclaim 55 wherein said means for substantially reducing the current flow includes a pair of capacitors for triggering the gate of respective said thyristors, said capacitors discharging below the firing potential whenever an improper load circuit providing current flow in said opposite direction is connected to said output terminals of said supply circuit, said means for substantially reducing the current flow further including a pair of rectifiers respectively connected between the gate and anode of respective said thyristors and oriented in a direction opposite to said one direction.

57. The system as defined in claim 56 wherein said supply circuit further includes a pair of resistors respectively connected between the gate and anode of respective said thyristors and having a resistance value sufficiently high to maintain the firing angle of said thyristors substantially at 180 degrees, the RC time constant of each said resistor and capacitor associated with respective said thyristors being greater than one half-cycle of the alternating current source.

58. The system as defined in claim 35 wherein said supply circuit includes two input terminals one of which is connected to said pair of switching means and the other of which is connected to said other load input terminal.

59. The system as defined in claim 35 wherein said load circuit includes another pair of unidirectional blocking means connected in parallel to said load, said load being connected in series between said pair of unidirectional blocking means, said other pair of unidirectional blocking means being connected in series, said other input terminal being connected to and between said other pair of unidirectional blocking means, said other pair of said unidirectional blocking means having their conducting direction opposite to the conducting direction of said pair of unidirectional blocking means whereby full wave unidirectional current is delivered to said load from the source.

60. In a power system for supplying current to a proper load and a unidirectional blocking means connected in series for passing current in one direction and substantially no current in the opposite direction, the improvement comprising a supply circuit including a unidirectionally triggered switching means adapted to be connected to an alternating current source for supplying current in one direction therethrough, said supply circuit further including means for substantially reducing the current flow through said switching means in said one direction whenever an improper load providing current flow in a direction opposite to said one direction is connected to said supply circuit with said proper load and blocking means connected thereto, said means for substantially reducing the current flow including means for turning on said switching means when said proper load and blocking means are connected thereto without connection thereto of an improper load providing current flow in a direction opposite to said one direction, said latter means having a time constant greater than one half-cycle of the alternating current source whereby an improper load providing current flow in said opposite direction without said proper load and blocking means connected fails to turn-on said switching means.

61. The system as defined in claim 60 wherein said switching means is a thyristor.

62. The system as defined in claim 61 wherein said means for substantially reducing the current flow includes a capacitor for triggering the gate of said thyristor, said capacitor discharging below the firing potential whenever a load providing current flow in said opposite direction is connected to said supply circuit, said means for substantially reducing the current flow further including a rectifier connected between the gate and anode of said thyristor and oriented in a direction opposite to said one direction.

63. In a power system the combination comprising a controlled rectifier adapted to be connected in series with one output terminal of an alternating current source and terminating in a load terminal, and another load terminal adapted to be connected to another output terminal of an ulternating current source, said load terminals being adapted to be connected to a proper load circuit including a load and a series connected rectifier for passing half-wave current through the load, said controlled rectifier establishing a current path in a predetermined direction with the rectifier in the load circuit oriented in the same direction, a resistor-capacitor phase control circuit connected in parallel with said controlled rectifier for controlling the turn-on and turn-off potential of the gate electrode of said controlled rectifier, said controlled rectifier being turned-off when an improper load circuit is connected between said load terminals which provides current in a direction opposite to said predetermined direction with a proper load circuit connected across said load terminals whereby current from the alternating current source through said controlled rectifier is substantially terminated, the RC time constant of said control circuit being greater than one half-cycle of the alternating current source.

64. The system as defined in claim 63 further comprising another controlled rectifier adapted to be connected in series with the same one output terminal of the same alternating current source and terminating in another load terminal, said load terminals and said other load terminal being adapted to be connected to a proper load circuit including a load and pair of rectifiers for passing full wave current through the load, said other controlled rectifier establishing a current path in another predetermined direction with one of the rectifiers in the proper load circuit oriented in the same direction, a resistor capacitor phase control circuit connected in parallel with said other controlled rectifier for controlling the turn-on and turn-off potential of the gate electrode of said other controlled rectifier, said other controlled rectifier being turned-off when an improper load circuit providing current in a direction opposite to said predetermined direction is connected across any two of said load and other load terminals.

65. In a power system the combination comprising a load and a supply circuit connected to said load and adapted to connect said load to an alternating current source, said supply circuit including a unidirectionally triggered switching means connected between said load and one terminal of an alternating current source for supplying current from an alternating current source to said load in one direction, said system including a unidirectional blocking means, said supply circuit further including means operatively connected to said switching meas and one terminal of an alternating current source and connected to another terminal of an alternating current source through said unidirectional blocking means for supplying triggering current in said one direction to turn-on said switching means, said means operatively connected to said switching means being operative substantially to reduce the current flow in said one direction through said switching means whenever a current flow in the opposite direction is provided by any shunting connection of said blocking means permitting minor current flow in both said directions through said means operatively connected to said switching means during turn-off thereof.

66. The system as defined in claim 65 wherein said switching means is a thyristor.

67. The system as defined in claim 66 wherein said blocking means is a rectifier.

68. The system as defined in claim 67 wherein said means operatively connected to said switching means includes a capacitor for triggering the gate of said thyristor, said capacitor discharging below the firing potential whenever a load circuit providing current flow in said opposite direction is connected to said supply circuit.

69. The system as defined in claim 68 wherein said means operatively connected to said switching means further includes a rectifier connected between the gate and anode of said thyristor and oriented in said opposite direction.

70. The system as defined in claim 68 wherein said supply circuit further includes a resistor connected between the gate and anode of said thyristor and having a resistance value sufficiently high to maintain the firing angle of said thyristor substantially at 180°, the RC time constant of said resistor and capacitor being greater than one half-cycle of an alternating current source adapted to supply current to said load.

71. The system as defined in claim 65 wherein said blocking means is connected between said load and another terminal of an alternating current source.

72. The system as defined in claim 65 further comprising a load housing enclosing said load and a supply housing enclosing said supply circuit, said unidirectional blocking means being located within one said housing.

73. In a power system the combination comprising a load connected to a supply circuit, said supply circuit including a pair of unidirectionally triggered switching means adapted to be connected to an alternating current source for supplying current in both directions to said load, one of said unidirectionally triggered switching means passing one half-cycle of current from the source in one direction through said load and back to the source, the other of said unidirectionally triggered switching means passing the other half-cycle of current from the source in a direction opposite said one direction through said load and back to the source whereby substantially full wave current is delivered to said load from the source, said system including a pair of unidirectional blocking means, said supply circuit including a pair of means operatively connected to said pair of switching means and connected to the source through said pair of unidirectional blocking means for supplying trigger current in each of said directions to turn-on said pair of switching means and for substantially reducing the current flow through each of said switching means in respective said direction whenever a current flow opposite the respective said direction is provided by any shunting connection of its said blocking means permitting current flow in both said directions.

74. The system as defined in claim 73 wherein said means for substantially reducing the current flow includes a resistor in series with a capacitor connecting between said pair of means operatively connected to said pair of switching means.

75. The system as defined in claim 74 further comprising a gaseous discharge bulb and a series connected reset switch in parallel with said capacitor.

76. The system as defined in claim 73 wherein each of said unidirectionally triggered switching means is a thyristor, and each of said blocking means is a rectifier.

77. The system as defined in claim 73 wherein said means for substantially reducing the current flow includes a capacitor connecting between said pair of means operatively connected to said pair of switching means.

78. The system as defined in claim 73 wherein said means for substantially reducing the current flow includes a resistor in series with a gaseous discharge bulb connecting between said pair of means operatively connected to said pair of switching means.

79. In a power system the combination comprising a load and an electrical switching means connected between one terminal of an alternating current source and said load, said system further comprising a control means connected to said switching means and connected between one terminal of an alternating current source and the connection between said load and switching means, said system including a unidirectional blocking means in series with said load, said blocking means and load being connected to another terminal of an alternating current source, said blocking means providing current in one direction through said control means, said control means being responsive to current in said on direction to render said switching means conductive, and responsive to reverse current passing through any shunting connection in a direction opposite to said one direction to render said switching means non-conductive whereby current flow is substantially reduced through said switching means and load, and minor current flow in both said directions passes through said control means during the time said switching means is non-conductive.

80. A protective current supply circuit for substantially preventing shock comprising means for distinguishing between a proper load and an improper load wherein a proper load is distinguished by a series connected blocking means for blocking reverse current to said supply circuit, said means for distinguishing including blocking means responsive to a connection across a series connected blocking means of a proper load which provides a reverse flow of minor current requirement relative to a major forward current requirement of a proper load for automatically and substantially terminating a major forward current supplied by said supply circuit and for automatically reestablishing a major forward current supplied by said supply circuit to a proper load whenever a connection which provides reverse flow is removed, said means for distinguishing including circuit means for passing forward and reverse minor currents of said supply circuit during the time that a connection is made across a series connected blocking means of a proper load providing reverse current flow.

* * * * *

UNITED STATES PATENT OFFICE
CERTIFICATE OF CORRECTION

Patent No. 3,997,818            Dated December 14, 1976

Inventor(s) Lawrence E. Bodkin

It is certified that error appears in the above-identified patent and that said Letters Patent are hereby corrected as shown below:

In the drawings Sheet 2, FIG. 5, the vertical leads extending upwardly from SCR's 102 and 103 should be connected by dots to the horizontal lead extending outwardly from the unnumbered resistance and capacitor bridge circuit (corresponding to resistance 91 and capacitor 92 of FIG. 3, Sheet 1).

Column 10, Line 61, "SCR's 2" should read --SCR's 62--

Column 19, Line 24, "14°" should read --14'--

Column 25, Line 49, after "indicative" insert --of--
Column 25, Line 53, "reduced" should read --reducing--
Column 25, Line 45, "cliam" should read --claim--
Column 25, Line 54, "inclaim" should read --in claim--
Column 26, Line 67, "ulternating" should read --alternating--
Column 27, Line 48, "meas" should read --means--
Column 29, Line 16, "on" should read --one--
Column 30, Line 8, "blocking" should be omitted Signed and Sealed this ninth Day of August 1977

[SEAL]

Attest:

RUTH C. MASON
*Attesting Officer*

C. MARSHALL DANN
*Commissioner of Patents and Trademarks*